US008353377B2

(12) United States Patent
Geiger et al.

(10) Patent No.: US 8,353,377 B2
(45) Date of Patent: Jan. 15, 2013

(54) STEERING CYLINDER MOUNTING ARRANGEMENT USED WITH A LENGTH-ADJUSTABLE AXLE

(75) Inventors: David W. Geiger, Ottumwa, IA (US);
Stephen K. Parsons, Ottumwa, IA (US);
Shirishkumar Jalindernath Chobhe, Pune (IN)

(73) Assignee: Deere & Company, Moline, IL (US)

( * ) Notice: Subject to any disclaimer, the term of this patent is extended or adjusted under 35 U.S.C. 154(b) by 771 days.

(21) Appl. No.: 12/573,989

(22) Filed: Oct. 6, 2009

(65) Prior Publication Data

US 2011/0079977 A1    Apr. 7, 2011

(51) Int. Cl.
*B62D 61/00* (2006.01)
*B62D 55/084* (2006.01)
*B62D 5/06* (2006.01)
*B60K 17/30* (2006.01)
*B62B 3/02* (2006.01)

(52) U.S. Cl. ....... 180/209; 180/340; 180/9.48; 180/436; 280/638

(58) Field of Classification Search .......... 180/9.48, 180/340, 209, 434, 435; 280/638, 42, 124.134, 280/124.135; 172/667, 641, 583
See application file for complete search history.

(56) References Cited

U.S. PATENT DOCUMENTS

| | | | | |
|---|---|---|---|---|
| 4,029,165 A * | 6/1977 | Miller et al. | ................. | 180/6.48 |
| 4,359,123 A * | 11/1982 | Haupt et al. | ................. | 180/436 |
| 5,121,808 A * | 6/1992 | Visentini et al. | ............. | 180/435 |
| 5,454,583 A * | 10/1995 | Torborg | ........................ | 280/638 |
| 6,267,198 B1 * | 7/2001 | Hurlburt et al. | ............... | 180/414 |
| 7,028,459 B2 * | 4/2006 | Lohrentz et al. | ................ | 56/192 |
| 7,140,693 B2 * | 11/2006 | Dubay et al. | ................. | 299/39.1 |
| 8,020,648 B2 * | 9/2011 | Otto | ............................ | 180/6.48 |
| 2009/0152828 A1 * | 6/2009 | Bebernes et al. | .............. | 280/86 |
| 2009/0174166 A1 * | 7/2009 | Sloan et al. | ............ | 280/124.116 |

* cited by examiner

*Primary Examiner* — Tashiana Adams
*Assistant Examiner* — Daniel Yeagley

(57) ABSTRACT

A windrower having an adjustable axle to vary a width of steerable caster-mounted rear wheels operably connected by right and left steering cylinders mounted to right and left reaction arms pivoted to respective rods coupled to steering arms fixed to respective spindles mounted within a cylindrical receptacle at outer ends of the adjustable axle. One embodiment each reaction arm has a bracket coupled to a fixed portion of the rear axle when telescopic end sections of the axle are in a narrow width position, and selectively mounted to outer ends of the telescopic end sections of the axle when in a wide width position. A second embodiment has the reaction arms mounted to spindle receptacles at outer ends of the axle sections to provide the reaction arms with an infinite number of angular positions about the spindle receptacles for different tread widths of the steered rear wheels.

6 Claims, 4 Drawing Sheets

STEERING CYLINDER MOUNTING ARRANGEMENT USED WITH A LENGTH-ADJUSTABLE AXLE

FIELD OF THE INVENTION

The present invention relates to steering cylinder mountings and more specifically relates to such mountings as are applied for steering wheels at the opposite ends of an axle which is adjustable to vary the tread of the vehicle.

BACKGROUND OF THE INVENTION

Self-propelled windrowers typically include a main frame supported on a pair of front wheels, which are separately driven hydrostatically so as to afford steering to the windrower by driving the wheels at different speeds, and a pair of rear wheels which are mounted to opposite ends of a rear axle so that they pivot about an upright caster axis. Some windrowers are capable of delivering conditioned crop to one side of the vehicle to form a windrow in a region which may be located at least partially in the track behind the front wheel at that side of the vehicle in order to group the windrow with a previously formed windrow laid down along a path at the center of the vehicle between the front and rear pairs of wheels. The axle sections to which the rear wheels are telescopically mounted within a remaining middle section of the rear axle and are fixed in selected positions so as to change the distance between the rear wheels, with the rear wheel on the discharge side of the vehicle being adjusted inwardly towards the center of the vehicle so that the adjusted wheel will not run upon the crop windrow. An example of such a self-propelled windrower is disclosed in U.S. Pat. No. 7,028,459.

A hydraulic steering assist system (see U.S. patent application Ser. No. 11/957,800, filed on 17 Dec., 2007 and assigned to the assignee of the instant application) has been developed for steering the rear wheels of a self-propelled windrower in conjunction with the steering of the driven front wheels in order to give an operator more control over the self-propelled windrower when operated at relatively high road or transport speeds. The steering cylinders of this steering assist system are respectively secured to cylinder mounting assemblies respectively fixed at opposite end locations of a tubular middle section of the rear axle and into opposite ends of which opposite end sections of the axle are telescopically received for adjustment, with the rod ends of the cylinders being coupled to steering arms respectively fixed to top end regions of the upright spindles of the caster-mounted wheels. A drawback of this assist system is that, while the rear axle is disclosed as being adjustable in length, no provision is made for adjusting the position of the steering assist cylinder in order to accommodate for the change in axle length, and, hence, the change in the distance between the steering arm at the top of the caster spindle and the fixed steering cylinder.

The problem to be solved is to provide a simple cylinder mounting structure for resisting steering assist cylinder reaction loads and for also allowing the cylinder to be repositioned for maintaining steering function when the axle length has been adjusted.

SUMMARY OF THE INVENTION

According to the present invention there is provided a mounting assembly for a hydraulic steering cylinder coupled for effecting steering movements of a caster-mounted rear wheel, and more specifically there is provided a mounting assembly which overcomes the aforementioned drawbacks of the prior art mounting assembly.

A broad object of the invention is to provide a steering cylinder mounting assembly comprising a reaction arm mounted for movement with the adjustable section of the fixed rear axle so that the distance between the actuator and the steering arm remains constant and with the reaction arm being adjustable to any angular position about the caster-mounted wheel spindle so as to accommodate different track positions of the steered rear wheels and/or different machine configurations and/or improved access to the machine without interference with other parts, other attachments, or for any other reasons.

A more specific object of the invention is to provide a reaction arm, as stated in the previous object, which, when the axle is adjusted to a narrow track position, is mounted in a first orientation to a bracket fixed on the fixed section of the axle, and which, when the axle is adjusted to a wide track position is mounted directly to the adjustable section of the axle in a second orientation, disposed 45° from the first orientation, with the first and second orientations so that the reaction arm and supported steering cylinder is located, for example, for avoiding interference, for being in an aesthetically pleasing position, or for any other reason.

In accordance with a second embodiment, it is an object to mount the reaction arm to the spindle of the steered wheel in a manner which permits the reaction arm to be placed in an infinite number of positions about the spindle so as to provide improved access to other parts and/or avoid interference with other parts as changes are made in the track width of the steered rear wheels and/or to adapt to different machine configurations.

The object(s) pertaining to the first embodiment (is) are achieved by constructing the reaction arm so as to have one end defined by a mounting surface which disposes the reaction arm substantially fore-and-aft when the mounting surface is secured against a mounting surface of a bracket fixed to the fixed axle section, and which disposes the reaction arm at an angle of about 45° from fore-and-aft when the reaction arm mounting surface is secured against the moveable axle section.

The object(s) pertaining to the second embodiment (is) are achieved by providing a reaction arm having an end defined by a clevis which is clamped to top and bottom regions of a cylindrical spindle receptacle at the end of the axle which has the steerable wheel spindle located therein.

These and other objects of the invention will become apparent from a reading of the ensuing description together with the appended drawings.

DESCRIPTION OF THE PREFERRED EMBODIMENT

Figure 1:
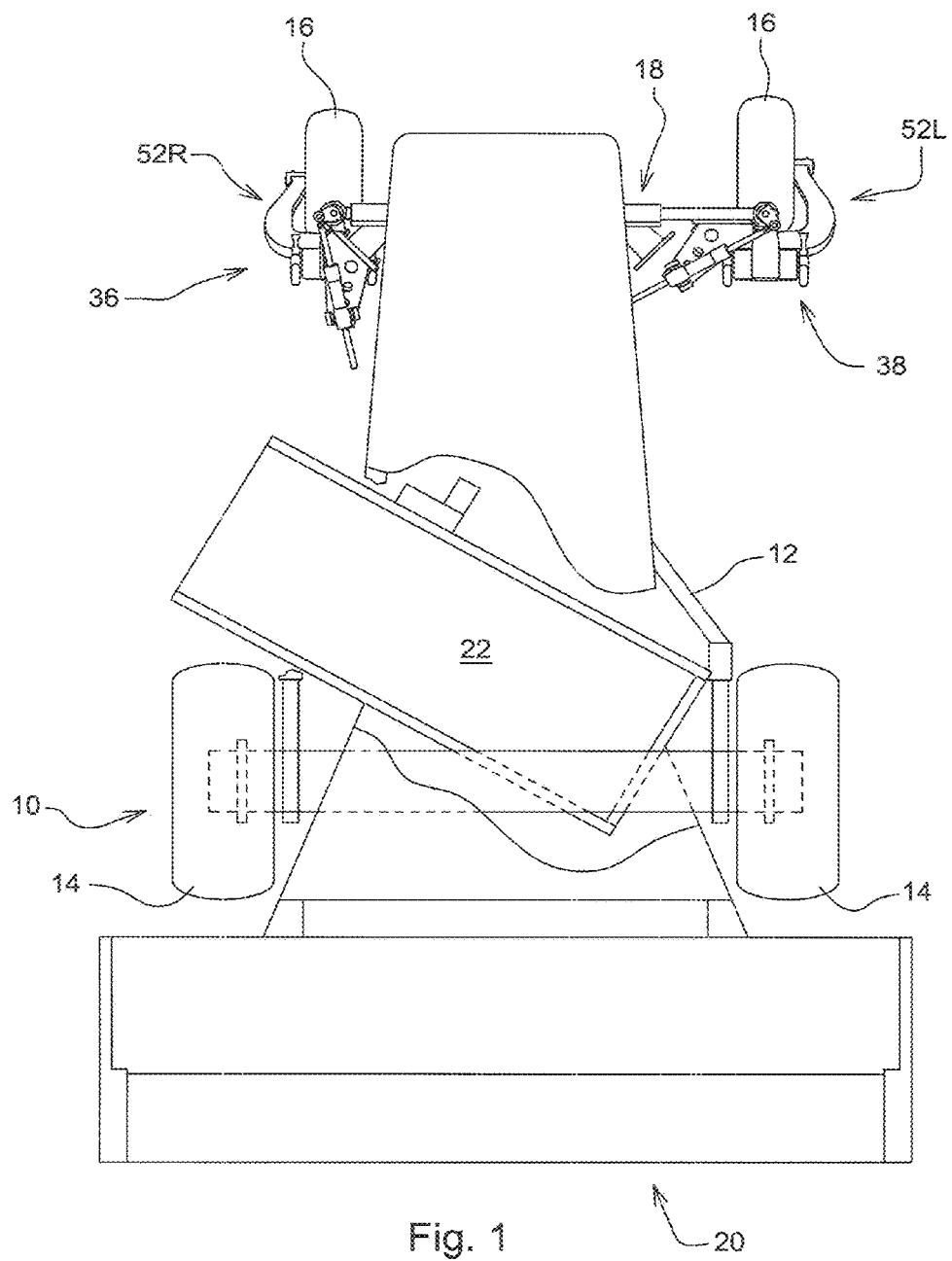
FIG. 1 is a schematic top view showing a self-propelled windrower with a cab and front section of a main frame removed revealing a windrow accumulator suspended from the frame for delivering crop to a location behind a right front, steerable drive wheel, and with rear wheels being shown caster-mounted to opposite ends of a fixed rear axle and coupled for being steered by hydraulic steering assist cylinders.

Referring now to FIG. 1, there is shown a self-propelled windrower 10 including a main frame 12 supported on a pair of driven front wheels 14 and on a pair of rear ground wheels 16 located at the opposite ends of an axle 18 located at the rear of the frame 12. A header 20 is suspended at a forward end of the frame 12 in a well known manner (not shown), with the header being equipped with crop cutting and conditioning arrangements (not shown), with the cutting arrangement being operable for severing stems of the crop at ground level and for feeding the severed crop into the conditioning arrangement which conditions and then propels the conditioned crop to the rear. A cross-conveyor 22 is suspended from the frame 12 in a conventional manner (not shown) so as to extend obliquely to a longitudinal center line of the windrower 10 from a location just inside the left front wheel 14 to a location just to the rear of the right front wheel 14, the conveyor 22 being mounted for selective movement between a lowered working position and a raised stand-by position. When in the lowered working position, the cross-conveyor 22 is disposed for receiving conditioned crop discharged rearwardly from the conditioning arrangement and for conveying this crop laterally to form a windrow of crop behind the right front wheel 14. When the cross-conveyor 22 is located in the raised, stand-by position, crop discharged from the conditioning arrangement is deposited on the ground beneath the cross-conveyor 22 so as to form a windrow extending along the longitudinal center line of the windrower 10 between the sets of wheels 14 and 16. In a manner known in the art, two crop windrows can be bunched together by first placing the cross-conveyor 22 in its raised position, and operating the windrower 10 to cut a swath of crop at the left side of a field of standing crop, thus forming a first windrow which lies along the longitudinal center of the windrower 10. Once this pass is completed, the cross-conveyor 22 is lowered and the windrower is driven in the opposite direction to cut a swath which, from the perspective of the operator, is located at the right side of the field of standing crop, the cross-conveyor then acting to deposit crop to the rear of the right front wheel 14 so as to form a second windrow alongside the first-formed windrow.

Figure 2:
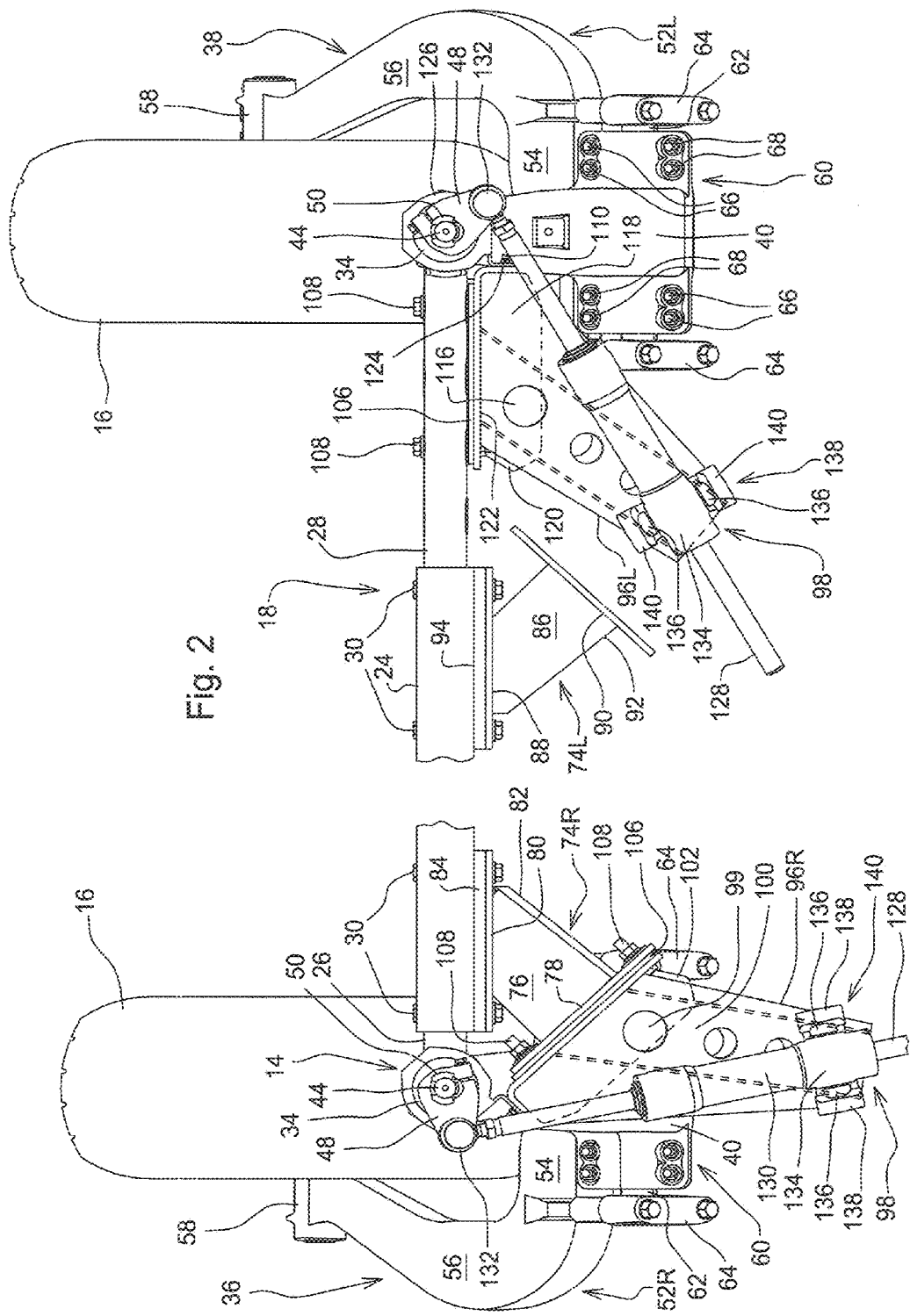
FIG. 2 is a schematic top view with parts broken away showing the fixed rear axle with the right caster wheel being shown in an inner adjusted position and the reaction arm being positioned so as to extend fore-and-aft, and with the left caster wheel being shown in an outer adjusted position and the reaction arm being positioned so as to extend transversely at an approximately a 45° degree angle to the axle.

Referring now to FIG. 2, the rigid rear axle 18, which is incorporated in the frame 12, includes a tubular fixed central section 24 having right and left end sections 26 and 28, respectively, telescopically received in opposite ends of the central section 24. Each of the axle end sections 26 and 28 is secured in a desired adjusted location by a pair of bolts 30 which pass through a pair of holes (not shown) provided in an end region of the central axle section 24 and a pair of aligned ones of a plurality of adjustment holes 32 (two shown in end section 26 in FIG. 3) spaced lengthwise along the adjustable axle end sections 26 and 28. The outer ends of each of the end sections 26 and 28 of the rear axle 18 is defined by a substantially cylindrical, upright spindle receptacle 34 (FIG. 3).

The rear wheels 16 are respectively caster-mounted to the spindle receptacles 34 by right and left wheel support arm assemblies 36 and 38, which are mirror images of each other.

Figure 3:
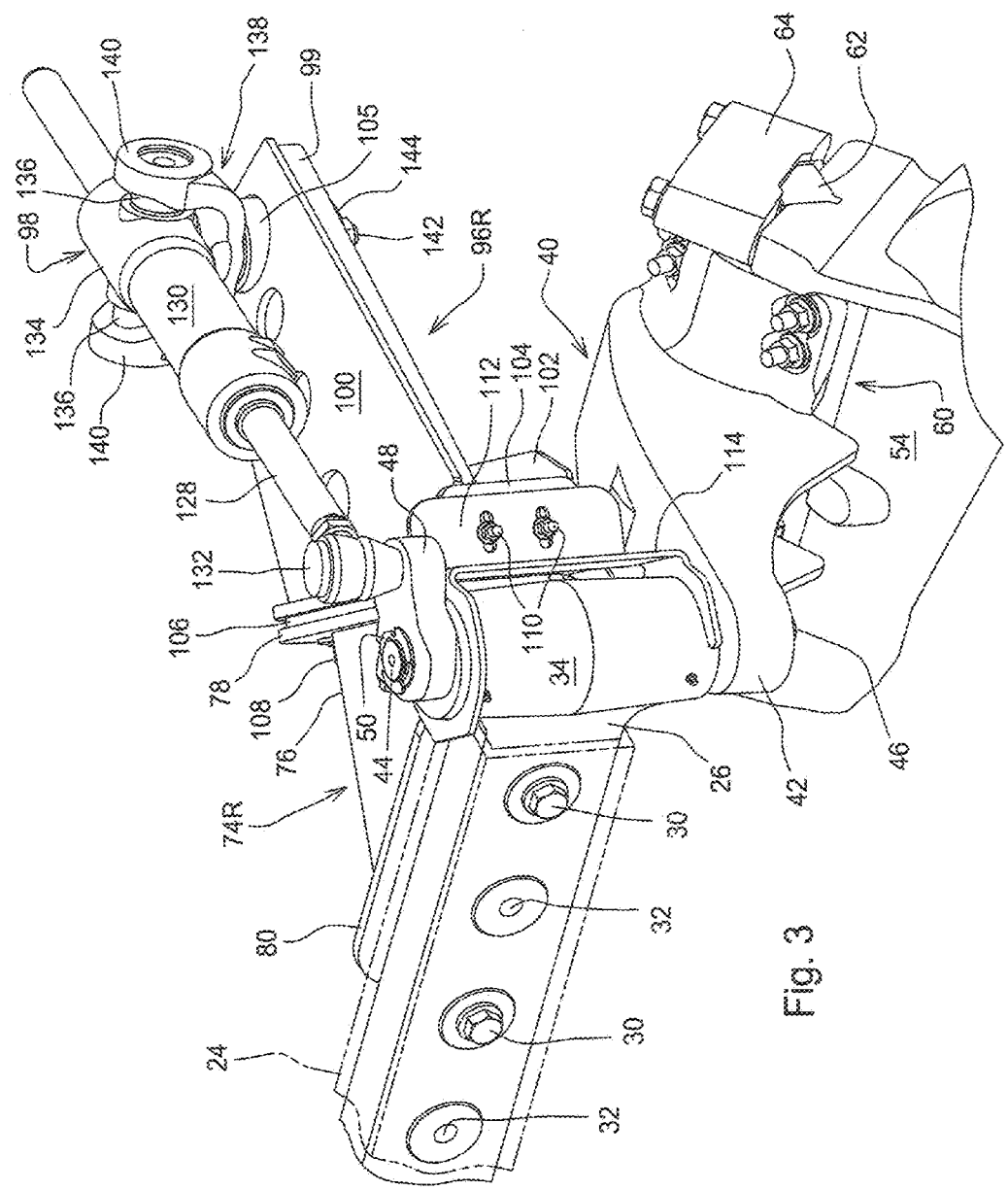
FIG. 3 is an enlarged right rear perspective view showing the right caster wheel and reaction arm positioned as depicted in FIG. 2.

Referring also to FIG. 3, it can be seen that each of the arm assemblies 36 and 38, as viewed with the wheels 16 oriented for traveling straight ahead as shown in FIG. 2, includes an upper mounting member 40 including a rear portion 42 containing a vertical cylindrical through bore provided with splines, with the through bore having a splined lower end of a spindle 44 received therein and held in place by a threaded bolt 46 on which a washer is received, the bolt being received in a threaded bore extending axially into a bottom end of the spindle 44. The spindles 44 of the arm assemblies 36 and 38 respectively project upwardly through the receptacles 34 at the ends of the axle sections 26 and 28. Upper ends of the spindles 44 are splined and a pair of steering arms 48 respectively contain splined openings in which the splined upper ends of the spindles 44 are respectively received, the arms 48 being held in place by circlips 50 received in grooves provided in upper end regions of the spindles 44. The arm assemblies 36 and 38 further include right and left, L-shaped wheel arms 52R and 52L, respectively. The wheel arms 52R and 52L each include an upper horizontal section 54 which extends in front of a respective one of the wheels 16 and is joined to a downwardly and rearwardly inclined section 56 such that the arms 52R and 52L respectively curve around to the right side of the right wheel 16 and to the left side of the left wheel 16 so that the wheels are approximately in fore-and-aft alignment with the spindles 44. The lower ends of the inclined arm sections 46 are respectively defined by cylindrical tubes 58 in which a stub shaft (not shown) is fixed, the stub shafts projecting inwardly from the tubes 58 and having respective hubs of the wheels 16 received thereon for rotation thereabout, as is well known in the art.

The arms 52R and 52L are respectively coupled to the upper mounting members 40 by a pair of suspension arrangements 60, which are each similar to that disclosed in U.S. patent application Ser. No. 11/968,759 filed 3 Jan. and having the same assignee as does the instant application. The suspension arrangements 60 each include a horizontal shaft 62 extending axially through a tube (not shown) having a square cross section and being disposed in parallel relationship to, and above, the horizontal section 54 of the wheel arms 52R and 52L. Opposite ends of the shaft 62 are fixed to the associated arm section 54 by clamp arrangements 64 with a central part of the shaft 50 being tightly engaged with resilient elastomeric members (not shown) located within the tube receiving the shaft 62. This tube is clamped to the upper mounting member 40 by a set of four, generally U-shaped bolts 66 located adjacent each end of the tube and which embrace the tube and have threaded ends projecting through holes provided in the upper mounting member 40 and receiving respective nuts 68.

With reference to FIGS. 2 and 3, it can be seen that right and left arm support brackets 74R and 74L, respectively, are mounted to right and left end regions of the central axle section 24. The support bracket 74R is a weldment comprising an inverted U-shaped channel member 76, which, in FIG. 2, extends rightwardly and rearwardly at an angle of 45° to a straight forward direction of travel and having a rear end joined to a vertical rear mounting plate 78 and a front end joined to a vertical front mounting plate 80. The bottoms of the opposite sides of the channel member 76 are fixed to a horizontal plate 82. The rear mounting plate 80 is clamped to a forward surface of the right end region of the central axle section 24 in sandwiching relationship to a spacer plate 84 by a pair of the bolts 30 which extend through aligned holes provided in the axle sections 24 and 26 and in the mounting and spacer plates 80 and 84, respectively.

The support bracket 74L is a mirror image of the support bracket 74R and includes an inverted U-shaped channel member 86 which extends leftwardly and rearwardly at an angle of 45° to a straight forward direction of travel, has front and rear ends respectively joined to vertical front and rear mounting plates 88 and 90, respectively, and has depending sides joined to a horizontal plate 92. The vertical front mounting plate 88 is clamped to the rear surface of a left end region of the central axle section 24 in sandwiching relationship to a vertical spacer plate 94 by the mounting bolts 30.

Right and left steering reaction arms 96R and 96L are respectively provided for supporting right and left, hydraulic steering cylinders 98 for steering the right and left rear wheels 16. The reaction arm 96R is defined by a weldment including a U-shaped channel member 99 which increases in height and width from front to rear, with the channel being closed by a top plate 100 fixed to the tops of opposite sides of the channel member, and has a bottom plate 102 extending beneath, and fixed to, a forward region of the web of the channel member 99. A forward end of the channel member 99 and the plates 100 and 102 define a vertical L-shaped upright edge assembly, as viewed from the top in FIG. 2, to which an L-shaped mounting plate 104 is fixed. Welded in place within circular openings provided in the top plate 100 and the web of the channel member 99, in a forward region of the reaction arm 96R, is an upright cylindrical mounting yoke stem receptacle 105 (only visible in FIG. 3).

When the axle section 26, together with the right wheel 16, is adjusted to an inner narrow track position as shown in FIG. 2, the long leg of the mounting plate 104 is clamped to the mounting plate 78 of the support bracket 74R in sandwiching relationship to a spacer plate 106 by a pair of bolts 108 respectively extending through aligned holes provided in opposite ends of the plates 78, 106 and 104. As can best be seen in FIG. 3, the short leg of the mounting plate 104 is clamped, as by vertically spaced bolts 110, to an upright plate 112 forming part of a U-shaped mounting bracket 114 having vertically spaced legs supported by the spindle receptacle 34. When the axle section 26, together with the right wheel 16 is adjusted to an outward wide track position, the L-shaped mounting plate 104 of the reaction arm 96R is secured to a front outer end region of the axle section 26 in sandwiching relationship to the spacer plate 106 by the bolts 108.

The reaction arm 96L is a mirror image of the bracket 96R and includes a channel member 116 which is visible through a hole provided in a top plate 118 fixed across the tops of opposite sides of the channel member. A bottom plate 120 is fixed across a forward region of the bottom of the channel member 116. A vertically oriented, L-shaped mounting plate 122 joins a complimentary-shaped forward end arrangement of the channel member 116 and plates 118 and 120. A left upright, cylindrical mounting yoke stem receptacle (not visible) is provided in a front end region of the reaction arm 96L.

When the axle section 28 is adjusted outwardly with the left wheel 16 to establish a wide track position, as shown in FIG. 2, the long leg of the L-shaped mounting plate 122 is clamped in sandwiching relationship to a left spacer plate 106 by a left pair of bolts 108, while the short leg is clamped, as by a left pair of vertically spaced bolts 110, to an upright plate 124 forming part of a U-shaped mounting bracket 126 having vertically spaced legs supported by the left spindle receptacle 34. In the case where the axle section 28 is placed in an inward position along with the wheel 16 to establish a narrow track position of the left wheel 16, the long leg of the L-shaped mounting plate is clamped to the mounting plate 90 of the support bracket 74L in sandwiching relationship to the left spacer plate 106 by the left pair of bolts 108.

The right and left hydraulic steering cylinders 98 each include a rod 128 projecting axially through a barrel 130 in which is located a piston (not shown) which is fixed to the rod for reciprocation within the barrel. A forward end of the cylinder rod 128 is connected to the right steering arm 48 by a coupler 132 which includes a stem that projects downwardly from a ball section and is received in a hole provided in the arm 48 and secured in place by a nut (not visible) received on threads at the bottom of the stem. The barrel of each hydraulic cylinder 98 has a cylindrical collar 134 received on, and fixed to a front end thereof. A pair of horizontal, axially aligned trunnions 136 are fixed to opposite sides of the collar 134. Right and left, generally Y-shaped mounting yokes 138 are respectively provided for mounting the right and left cylinders 98 to the reaction arms 96R and 96L. Specifically, each mounting yoke 138 includes a pair of upright limbs 140 containing aligned holes respectively receiving the pair of trunnions 136 of an associated one of the cylinders 98. The upright limbs 140 of each of the mounting yokes 138 have lower ends joined to an upright stem (not visible) received for rotation within the left upright receptacle 105 of the associated reaction arm 96R or 96L. The stem is retained in place by a bolt 142 carrying a washer 144 and being received in a threaded opening extending axially into the yoke stem.

It will be appreciated that the alternate mounting positions for the reaction arms 96R and 96L make it possible to locate the right steering cylinder 98 in a protected location wherein it extends along side the frame of the windrower 10 without the frame interfering with the operation of the cylinder when the right wheel 16 is located in its narrow track position, as shown in FIGS. 1 and 2, and makes it possible to locate the left steering cylinder 98 in a protected location wherein it extends along the axle 18 without the axle or the frame of the windrower interfering with the operation of the steering cylinder. Further, it will be appreciated that reaction forces imposed on the steering cylinders 98 during steering operations will be transferred to the barrel of the cylinder, and from there through the yoke and associated reaction arms 96R and 96L. During operation, the cylinders 98 will pivot at the trunnions 136 received in the yoke 138 and/or about the yoke stem, thus preventing undesirable side loads on the cylinder rod 128.

Figure 4:
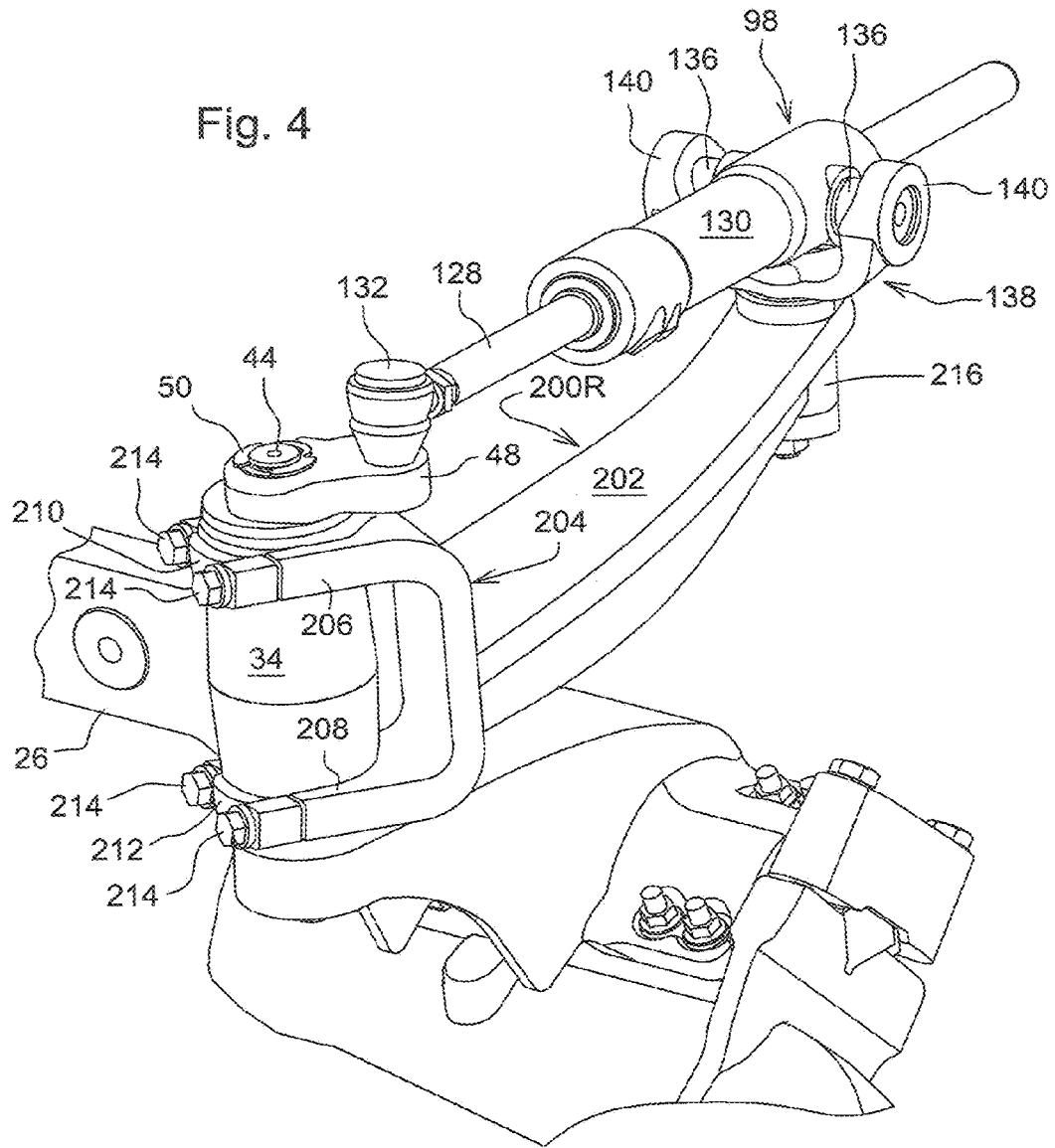
FIG. 4 is a perspective view similar to that of FIG. 3, but showing a second embodiment wherein the reaction arm is mounted to the spindle receptacle at the end of the right adjustable axle section cylinder to the reaction arm and a steering arm fixed to the top of the caster spindle.

Referring now to FIG. 4, there is shown a reaction arm 200R constructed in accordance with a second embodiment of the invention and illustrated in a position corresponding to that when the right wheel 16 is located in its narrow track position, as shown in FIGS. 1 and 2. The reaction arm 200R includes an elongate body 202 which is T-shaped in cross section throughout a substantial portion of its length and includes an inner end defined by a clevis 204 including upper and lower limbs 206 and 208, respectively, having removable ends 210 and 212 secured with capscrews 214 securing the ends to a remaining portion of the limbs, so as to releasably secure the upper and lower limbs respectively to upper and lower regions of the right spindle receptacle 34. An upright cylindrical receptacle 216 is welded within a circular opening provided in an outer end region of the elongate body 202, and the upright stem of the yoke 138 is received for swiveling within the receptacle 216, just beyond an outer end of a vertical leg which forms the stem of the T-shaped cross section. The steering cylinder 98 has its rod end coupled to the steering arm 48 at the top of the wheel spindle and the barrel of the steering cylinder 98 is located between and mounted to the limbs 140 of the yoke by trunnions 136 joined to the barrel of the cylinder and establishing a horizontal pivot axis about which the cylinder may pivot.

With the right wheel 16 being in its narrow track position, as illustrated, the reaction arm 200 is disposed substantially parallel to the forward direction of travel of the windrower 10, and when the right wheel 16 is in a wide track position, the reaction arm 200 will preferably be placed in a position wherein it extends substantially parallel to the rear axle 18. However, this need not be the case since the structure of the clevis 204 makes it possible to adjust the reaction arm 200 to an infinite number of angular positions about the spindle receptacle 34.

Having described the preferred embodiment, it will become apparent that various modifications can be made without departing from the scope of the invention as defined in the accompanying claims.

The invention claimed is:

1. In a vehicle including an axle having opposite ends defined by a pair of upright cylindrical receptacles, a caster wheel assembly including an upright caster spindle mounted for swiveling in each of said receptacles and being joined to a wheel support arm to which a wheel is rotatably mounted, each of said caster spindles having a steering arm fixed to an upper end thereof, a pair of reaction arms having first ends respectively releasably fixed to a fixed section of said axle, and a hydraulic steering assist cylinder being coupled between each steering arm and an adjacent reaction arm, the improvement comprising: said reaction arms each being selectively mounted to said axle for movement between at least a first position, wherein an associated steering cylinder extends approximately parallel to a direction of travel of the vehicle, and a second position, wherein an associated steering cylinder is disposed in a second position approximately at a right angle to said first position.

2. The vehicle, as defined in claim 1, wherein each of said cylinders has a barrel mounted to an associated one of said reaction arms by a coupling member including a Y-shaped yoke having limbs disposed in straddling relationship to said barrel and joined to an upright post mounted to a location of said reaction arm for swiveling about an upright axis extending substantially parallel to a caster axis; and said barrel being provided with oppositely projecting, axially aligned trunnions respectively received for pivoting in said limbs of said yoke for establishing a tilt axis about which said steering cylinder may pivot.

3. The vehicle, as defined in claim 1, wherein said fixed axle includes a tubular center section having opposite ends respectively telescopically receiving right and left end sections of said axle, with the end sections each having an end defined by one of said pair of upright cylindrical receptacles, whereby said end sections may be moved between, and secured in outward wide track positions and inward narrow track positions; and each said reaction arm being mounted to said center section in said first position when an associated end section of said axle is in said narrow track position, and is mounted to said associated end section in said second position when said associated end section of said axle is in said wide track position.

4. The vehicle, as defined in claim 3, wherein right and left support brackets are respectively fixed to a forward surface of opposite end regions of said center section of said axle, with said right support bracket extending to the right and forward at an angle of approximately 45° to a longitudinal axis of said axle and including a first vertical mounting plate disposed in a plane making an angle of 45° with said longitudinal axis, and with said left support bracket extending to the left and forward at an angle of approximately 45° to the longitudinal axis of said axle and including a second vertical mounting plate disposed in a plane making an angle of 45° with said longitudinal axis; and said right and left reaction arms including respective third and fourth vertical mounting plates which are clamped to said first and second vertical mounting plates when said right and left end sections are in said narrow track positions, and are clamped against outer end regions of said right and left end sections of said axle when said right and left end sections are in said wide track positions.

5. The vehicle, as defined in claim 3, wherein each of said reaction arms has an end defining a coupling structure secured to an associated one of the spindle receptacles, with the angular position of the reaction arm to the associated one of the spindles being a selected one of an infinite number of positions extending between, and including, said first and second positions and being related to the adjusted positions of the end sections of the axle.

6. The vehicle, as defined in claim 5, wherein the coupling structure of each of said reaction arms is a clevis constructed to be releasably clamped to upper and lower regions of an associated one of the upright spindle receptacles.

\* \* \* \* \*